April 20, 1971   D. B. CUTLER ET AL   3,575,755
CODE DATING WITH HEAT SHRINKABLE AND PRESSURE FEATURES
Filed Sept. 8, 1967   2 Sheets-Sheet 1
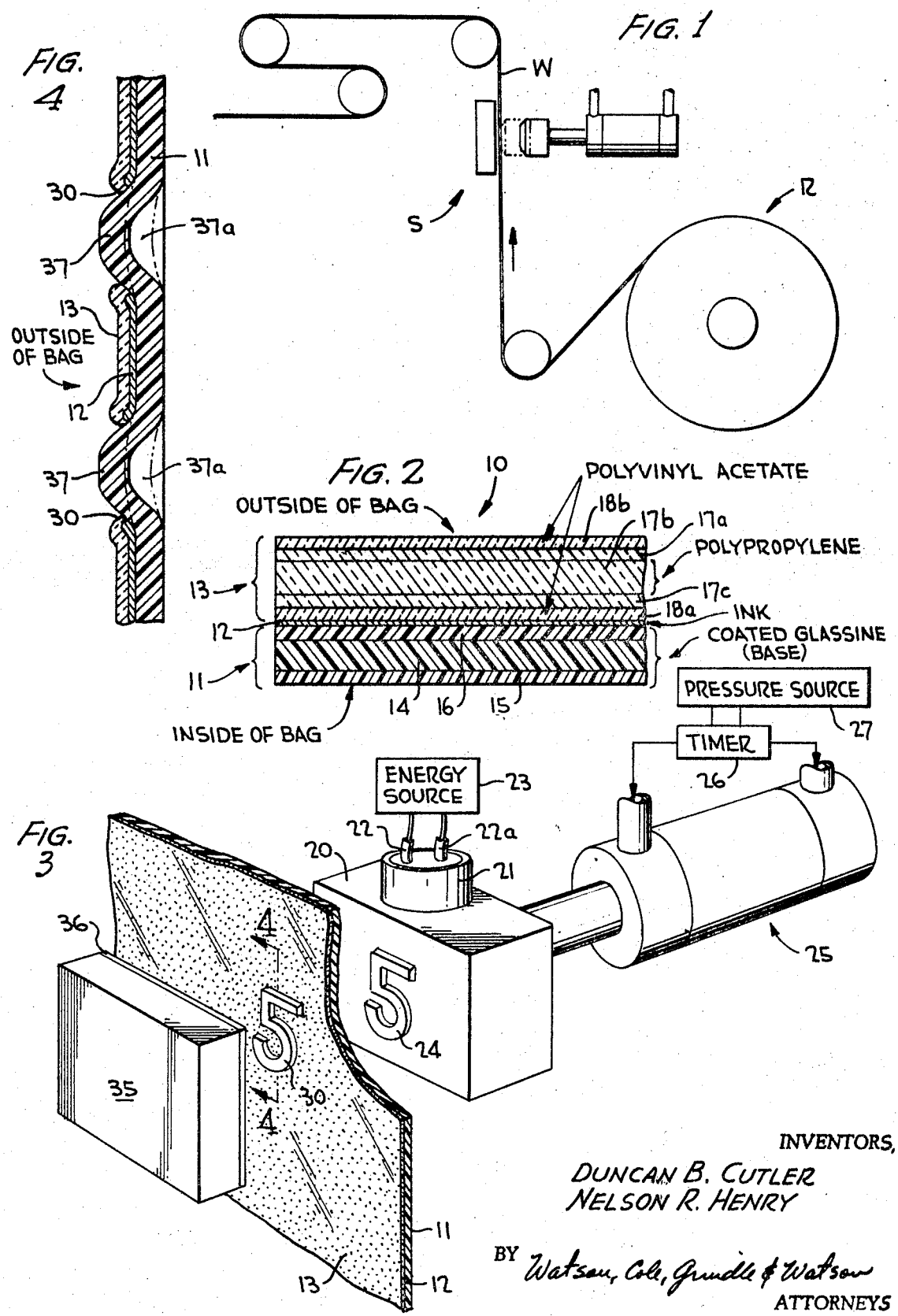
INVENTORS,
DUNCAN B. CUTLER
NELSON R. HENRY
BY Watson, Cole, Grindle & Watson
ATTORNEYS April 20, 1971  D. B. CUTLER ET AL  3,575,755
CODE DATING WITH HEAT SHRINKABLE AND PRESSURE FEATURES
Filed Sept. 8, 1967  2 Sheets-Sheet 2
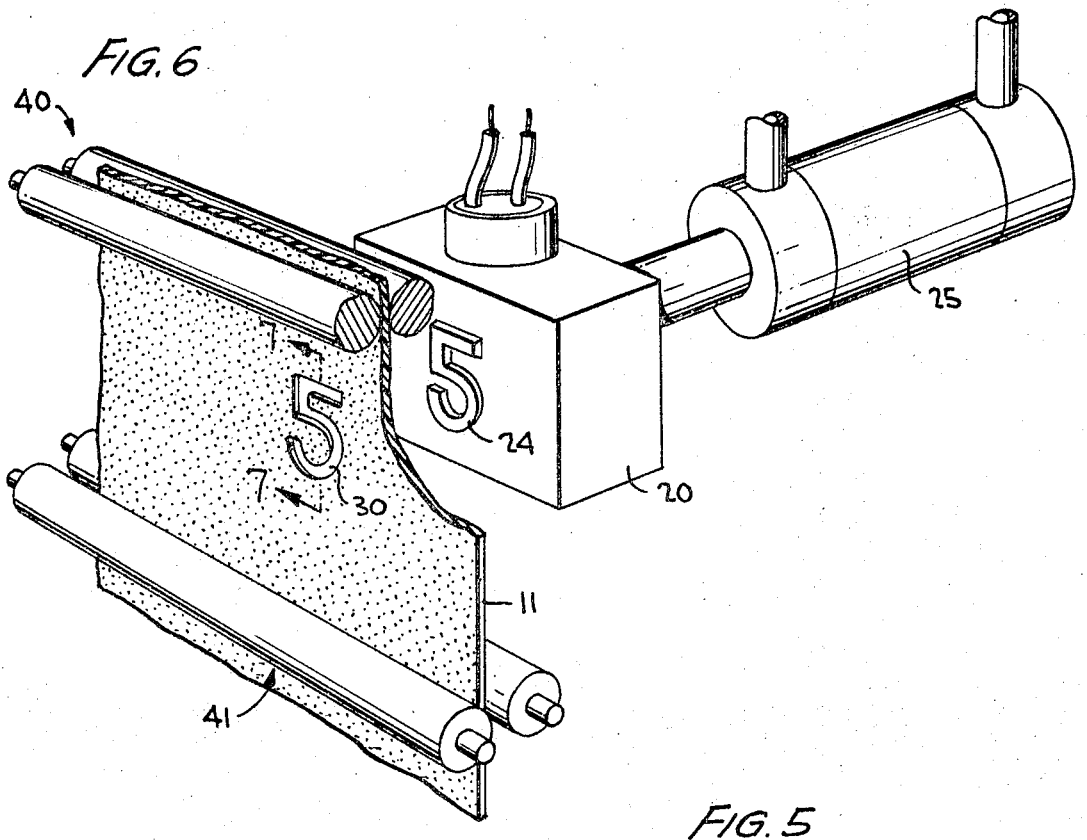
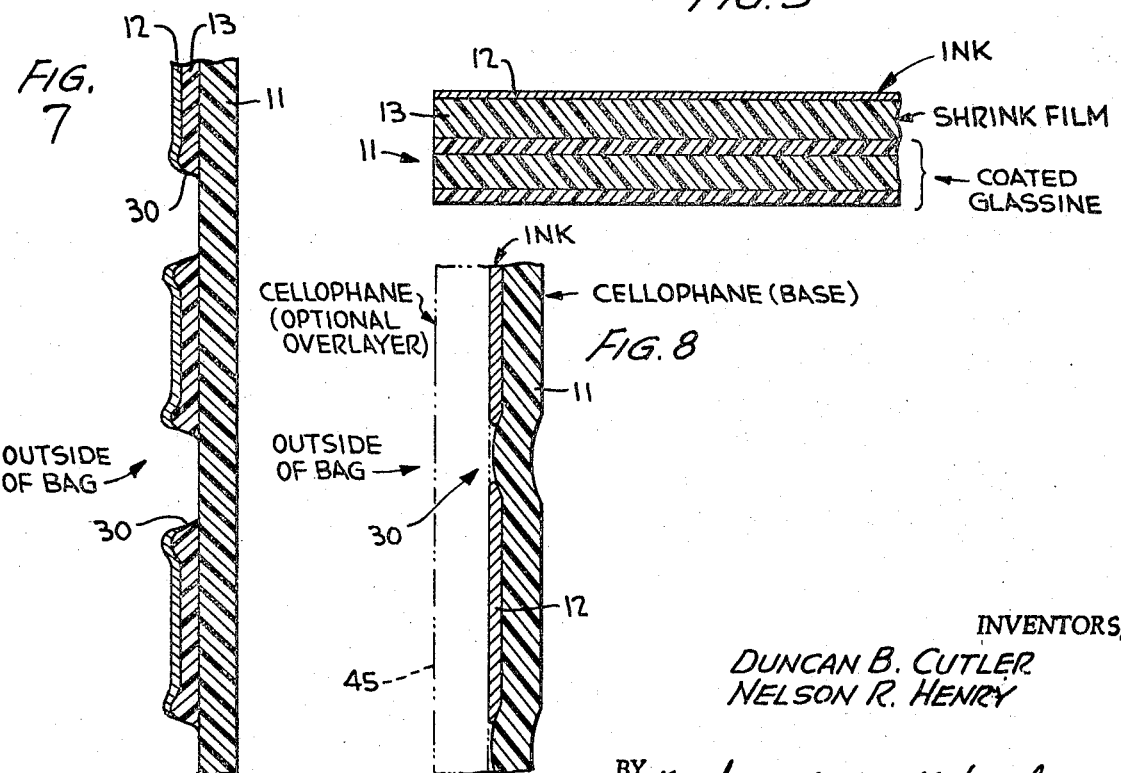
INVENTORS,
DUNCAN B. CUTLER
NELSON R. HENRY
BY Watson, Cole, Grindle & Watson
ATTORNEYS

United States Patent Office 3,575,755
Patented Apr. 20, 1971

3,575,755
CODE DATING WITH HEAT SHRINKABLE AND PRESSURE FEATURES
Duncan B. Cutler and Nelson R. Henry, Decatur, Ga., assignors to The Woodman Company, Inc., Decatur, Ga.
Filed Sept. 8, 1967, Ser. No. 666,278
Int. Cl. B31f 1/00
U.S. Cl. 156—85
13 Claims

ABSTRACT OF THE DISCLOSURE

Marking of packaging material utilizing an existing ink layer in the material and an adjacent heat shrinkable layer by applying heat in the form of indicia to cause withdrawal of said layers to allow the different colored base sheet to show through. Also, withdrawal of the ink layer may be by pressure of a raised indicia against a rigid backing to cause said ink layer to be squeezed away, and the heat and pressure is applied to the back side of said base sheet with the rigid backing being Teflon-coated to prevent adherence of said layers.

---

The present invention relates generally to the art of packaging and, more particularly, to an improved method for code dating packaging material with identifying indicia.

As is well known, when a package is formed and filled with a product which is subject to spoilage or expiration, each package must be code dated to indicate the information as to the time and place at which the packaging operation took place. This is for the purpose of monitoring the packages on the shelf of the store to insure that only desirable products which are fresh may be purchased.

Obviously, one requirement for code dating a package is that the code dating take place substantially simultaneously with the packaging operation so that the proper time and batch of contents can be accurately identified. In the past, this code dating process has been practiced by applying an area of ink coating in the form of a coded indicia on the outside surface of the package in a location where it is easily discernible by the supplier who monitors the packages. These methods have certain obvious disadvantages in that they are subject to drying problems which are encountered when printing with wet ink on the generally nonabsorbent material used in modern packages. In attempts to overcome this shortcoming, thermographic processes have been developed which utilize a tape having a thermoplastic coating which is transferred to the package upon being engaged by a heated die. However, these processes require expensive tape feeding equipment and of course are subject to the reoccurring expense of the expendable tapes with thermoplastic coating.

Recently, it has been proposed to utilize coatings which are already on the packaging material in order to form the required coded indicia on the package rather than to use the application of an additional coating of ink or thermoplastic layer on top of the existing packaging material. This concept is described and claimed in an application filed in the name of one of us, Nelson R. Henry, entitled "Packaging With Code Dating," filed June 5, 1967, now U.S. Pat. No. 3,473,286, issued Oct. 21, 1969, and assigned to the present assignee. As can be seen from reviewing this earlier application, a change is brought about in the existing coating of the material by the application of heat in the form of the indicia. More particularly, in the preferred embodiment illustrated therein, the change in the coating relies on the physical intermixing of two contrasting layers and/or the chemical reaction within the coating to cause the same to change color whereby the indicia is formed by the resulting color contrast.

One object of the present invention is to provide a similar method of code dating to that described in the prior application which is more adaptable to certain types of packaging material.

It is another object of the present invention to provide a method of code dating wherein no special inks are needed and the coded indicia may be formed directly on the dress of the package.

It is still another object of the present invention to provide a code dating method of the type described wherein the resulting color contrast is brought about by providing a gap in an ink layer which contrasts with the base sheet thereby forming the indicia by resulting color contrast.

Thus, to consider the present invention briefly, one embodiment of the method includes the steps of providing a packaging material including at least a base sheet, a heat shrinkable plastic layer and a thermoplastic ink layer attached thereto, applying heat and pressure in the form of indicia to the material, and maintaining the same for a time period sufficient to cause the ink layer to soften and for the plastic layer to withdraw from the area by shrinking.

In this arrangement, we have discovered that the withdrawal of the shrinkable film from the area of the heated indicia effects or improves the formation of a gap in the ink layer by carrying the ink film with it so that an indicia forming color contrasting gap is formed in the ink layer. It is believed that the withdrawing action of the ink layer along with the shrinkable film is due to an appreciable affinity of said ink layer for said shrinkable film and because of this the softened ink is not susceptible to running so that the indicia formed is not smeared and is highly legible. Further, by the simple expedient of biaxially orientating the shrinkable film, that is making it shrinkable along both and X and Y axes by placing the molecules in tension along both, the indicia are not distorted by uneven shrinking but are formed in a true shape.

In accordance with another salient feature of the inventive process, the formation of the coded indicia may be effected or enhanced by utilization of pressure of the heated die against the material which is held by a rigid backing so that the ink layer is physically squeezed away from the area of said indicia whereby the base sheet is permitted to show through to provide a color contrasting gap in the ink layer corresponding to said indicia, as before. With this method, it will be realized that the only requirement is that the ink layer be sufficiently thermoplastic to soften in response to a relatively low temperature so that the pressure applied is operative to form the coded indicia without injuring the base sheet of the material. Inks which meet this requirement are in wide use in packaging material today so that the process of the invention is highly compatible with the same. Also, this method has been found to be applicable to a wide variety of present-day laminated packaging materials utilizing such divergent base sheet materials as cellophane, coated glassine, saran, and some heat-resistive fibrous papers.

In accordance with another aspect of the present invention, the application of heat and pressure to the packaging material is preferably carried out against a rigid backing having a smooth nonstick surface, such as may be provided by a tetrafluoroethylene resin exemplified by the material sold under the trade name "Teflon" by E. I. du Pont deNemous & Company, Wilmington, Del. With the employment of this rigid backing, the base sheets of the packaging material may be given a slight indentation to further enhance the distinctiveness of the formed indicia. Preferably, the code dating operation is performed by applying a heated raised die against the back side of the base sheet whereby the base sheet is caused to have a permanent indentation into the gap formed by the heat and pressure of the die. When practicing the method of the invention in this preferred manner, the ink and/or shrinkable film will engage the Teflon-coated surface of the backing member; however, because of its nonstick properties, and the greater affinity of the layers for themselves, the operative surface of said member remains free of foreign matter in readiness for the next coding operation.

In practicing this invention, it has been found that the heat required to soften ink players which are normally utilized in packaging material is in the neighborhood of 400° F.; and in most cases, the pressure required is not great but only a few pounds per square inch. The optimum dwell time for the application of the heated die against the packaging material with a shrink film is not great and can be generally described as being in the neighborhood of one-quarter of a second; however, as will be realized, all of these parameters will vary according to the material used and the results desired. In any case, the heat and pressure are selected to be insufficient to affect the integrity of the base sheet, thereby protecting the packaging material from being weakened.

Still other objects and advantages of the present invention will become readily apparent to those skilled in this art from the following detailed description, wherein we have shown and described only the preferred embodiment of the invention, simply by way of illustration of the best mode contemplated by us of carrying out our invention. As will be realized, the invention is capable of other and different embodiments, and its several details are capable of modification in various obvious respects, all without departing from the invention. Accordingly, the drawings and description are to be regarded as illustrative in nature, and not as restrictive.

In the drawings:

FIG. 1 is a schematic view of a portion of the web feeding apparatus of a conventional form and fill machine showing the code dating station;

FIG. 2 is a greatly magnified cross-sectional view of one form of sheet material which may be utilized to practice the code dating method of the present invention;

FIG. 3 is an enlarged perspective view of the code dating station of FIG. 1;

FIG. 4 is a cross-sectional view taken along line 4—4 of FIG. 3 illustrating the coded indicia formed in the packaging material;

FIG. 5 is a cross-sectional view of another type of sheet material which is susceptible to use with the method of the present invention;

FIG. 6 is an enlarged perspective view of a schematic arrangement at the code dating station illustrating another embodiment of an apparatus suitable for carrying out the invention;

FIG. 7 is a cross-sectional view taken along line 7—7 of the sheet material with the indicia formed; and FIG. 8 is a cross-sectional view of still another type of sheet material which can be code dated by the practice of the present invention.

To describe the method of the present invention in detail, reference can be made first to FIG. 1 of the drawings wherein is shown a portion of the web feeding system of a form and fill packaging machine. As such, there is illustrated a roll of packaging material R in the form of a web W which is suitably trained about a plurality of guide rollers for intermittent feed past a code dating station S. It is, of course, understood that the remainder of the machine and the general orientation of the parts in this figure are conventional and that this showing is merely for the purpose of disclosing an operative manner in which the method can be practiced.

As has appeared above, the practice of the present invention is adaptable to a select group of sheet materials which are particularly adapted for use in packaging expendable products and a cross-sectional view of one such suitable type of sheet material 10 is shown in FIG. 2. Thus, the base sheet of the web W is or may be formed by a sheet of coated glassine generally designated by the reference numeral 11, an ink layer 12 that preferably forms the dress of the package, and a heat shrinkable, transparent plastic layer, generally designated by the reference numeral 13. As noted in FIG. 2, the inside of the finished package or bag in the case of a form and fill arrangement is formed by the surface of the base sheet 11 with the outside of the bag being formed by the plastic layer 13. In this form, the coated glassine can be of conventional construction, including an inner layer 14 of grease barrier material surrounded with outer wax layers 15, 16 which are formed of moisture barrier material so that the package is not only grease-proof for packaging greasy food products, such as potato chips, but is also moisture-proof to keep the product fresh. The color of base sheet 11 is given by the inner layer 14 and the wax layers 15, 16 and is selected to be contrasting to the color of the dress of the bag or ink layer 12, for an important reason to appear more fully below.

The heat shrinkable layer or shrink film can include a pair of sub-layers of polyethylene, as indicated by reference numerals 17a, 17c on opposite sides of a shrink active sub-layer 17b of polypropylene, all sandwiched between two polyvinyl acetate film sub-layers 18a, 18b. This combination, or its equivalent of course, is primarily to afford additional protection of the product from the deleterious ambient conditions outside the finishing bag. The shrink active sub-layer 17b gives the combination the desired shrinkable feature due to its molecules being layered together under tension, and preferably this molecular-layered construction is biaxially orientated so that the tension in the shrinkable layer 13 is such that the composite shrinkage upon the application of heat is substantially equal in all directions, which is of importance in forming coded indicia of true shape, as will be seen later in detail.

The polyvinyl acetate sub-layers 18a, 18b are also included in the plastic layer 13 because of their superior ink receiving or printing characteristics, which is due to their greater affinity for forming a molecular bond with ink, such as the ink layer 12. Because of this, the ink layer 12 is in practice usually reverse printed on the layer 18a and then the layers 12, 13 are combined with the base sheet 11 by intermolecular action resulting from a heating and pressing operation or, in the alternative, by providing a layer of adhesive.

It should be noted that one reason the outer polyvinyl acetate sub-layer 18b has heretofore been employed was to specifically allow the application of ink to the outside of the bag in accordance with the prior code dating processes outlined above. As is apparent, this sub-layer 18b thus becomes unnecessary when utilizing the present method since the coded indicia is formed in the existing ink layer 12 rather than by applying a new coating of ink to the outside of the bag. Thus, the sub-layer 18b could be eliminated, allowing the sheet material 10 to be reduced in cost; however, on the other hand the existence of this extra sub-layer 18b does in no way adversely affect the successful carrying out of the process.

In FIG. 3 there is shown an enlarged view of the code dating station S of FIG. 1, which may, for the purposes of describing the present invention, comprise a die 20 constructed of any suitable heat conducting material, such as metal, and which has attached thereto or imbedded therein a heater 21 to be supplied with suitable electric current via the electric lines 22, 22a from an energy source 23. On the operative face of the die 20, there is provided a suitable raised indicia 24 which, as can be realized, may take any suitable shape or form for the intended purpose.

Preferably, the die 20 is carried by a double-acting fluid cylinder 25, which is operative to periodically reciprocate the die 20 toward and away from the web W during each packaging cycle, as shown by the alternate positions of FIG. 1. This motion and the dwell time of the die 20 against the web W during the formation of the coded indicia is controlled by a suitable timer 26 which receives controlled pressure fluid from pressure source 27. As mentioned above, the control of the heat, pressure and dwell time within the general vicinity given is important; however, because of variations in the characteristics of material that can be used, the selection of the right combination is best performed by a trial and error type of process, which is deemed to be well within the abilities of one skilled in this art.

It is significant that the die 20 is directed against the back side of base sheet 11 of the web W and, upon the selective application of heat by the raised indicia 24 to said base sheet 11, the ink layer 12 is softened in the area of said indicia 24 and the heat shrinkable layer 13 begins to shrink in all directions from the heated area because of the aforesaid stretched condition of the molecules within the layer 13. As a result of this shrinkage and because the ink layer 12 is firmly attached to said layer 13, a gap 30 (note FIGS. 3 and 4) is formed in said layers 12, 13. This withdrawing action away from the heated area of the layer 13 and the carrying with it of the ink layer 12 results in the exposure to view of the base sheet 11 from the outside of the bag. Because the base sheet 11 is selected to be a different or contrasting color from the ink layer 12, the exposure of the same through the gap 30, i.e. where the ink layer 12 no longer appears, forms a coded indicia from the resulting color contrast.

It is preferable to provide a rigid backing member 35 against which the pressure of the raised indicia 24 is directed. This backing member is provided with a nonstick coating 36, such as Teflon, on the operative face thereof in opposed relationship to the raised indicia 24 on the die 20, as shown in the embodiment of FIG. 3. It will be clear that heat shrinkable layer 13 comes in contact with the coating 36 but, due to its nonstick characteristics, and because of the affinity of the plastic layer 13 for the ink layer 12 and for itself, no residue is left on the operative surface so that the next coding operation may proceed. It is also of great advantage that the ink layer 12 has greater affinity for the plastic layer 13 than the base sheet 11; whereby said plastic layer 13 is particularly effective in carrying said ink layer with it as it flows outwardly away from the heated indicia 24 to form the gap 30 and thus the coded indicia.

A related and complementary action occurs during the code dating operation in the present invention which insures that the ink layer 12 is positively withdrawn and the gap 30 formed in the ink layer 12 to expose the underlying different color base sheet 11. This action is effective when the backing member 35 is used as in the embodiment of FIG. 3 and may be simply stated as follows: As the ink layer 12 softens under the application of heat, and pressure is applied to extend the sheet material 10 against the backup member 35, the ink in this area under the heated indicia 24 is in effect physically squeezed outwardly so as to cause the same to flow away from said area to form or more completely form the gap 30 in ink layer 12. In any case, the formation of the coded indicia by the gap 30 in the sheet material 10 takes place in an easy and particularly efficient operation and without the use of special inking or tape equipment and without the embodiment of special inks into the sheet material.

If desired, the pressure with which the heated indicia 24 is applied against the base sheet 11 may be selected to be sufficient to form a permanent raised indentation 37 which extends into said gap 30 to further enhance the distinctiveness of the coded indicia. By proper regulation of this pressure, it has been found that the amount of indentation may be selectively varied, as exemplified by the dashed line outline, designated by the reference 37a in FIG. 4.

Referring now to FIG. 5, there is illustrated a cross-sectional view of another type of sheet material which can be utilized to practice the invention. In this embodiment wherein like numerals refer to like elements for convenience, the ink layer 12 is positioned on top of the shrinkable film or plastic layer 13, which layers may in themselves be identical to those utilized in the arrangement of FIG. 2. As shown, the plastic layer 13 is carried by a base sheet 11 which can also be in itself identical to that shown in FIG. 2 so that the only substantive difference lies in the physical orientation of the ink layer 12 on the outside of the bag, as shown.

As shown in FIG. 6, the preferred arrangement of effecting the invention is also essentially the same as in the earlier embodiment in that the main step consists of applying a heated die 20 having a raised indicia 24 against the back face of the base sheet 11. It should be noted in this arrangement that upper and lower sets of tension inducing rollers 40, 41, respectively, are provided in lieu of the backup member 35. This maintains the section of the web W at the marking station S under sufficient tension to allow the necessary light pressure to be applied to form the gap 30 (FIG. 7) by heat shrink action to be described presently. Because of the absence of a positive backup surface, it can be noted that little or no permanent indentation is formed and that the above described pressure action performs substantially no role in the formation of the gap 30 in the layers 12, 13; however, a highly legible indicia is formed in the sheet material, as indicated in FIGS. 6 and 7.

Thus, the heat shrink action taking place upon engagement of the heated raised numeral 24 with the back side of the base sheet 11 in the embodiment of FIGS. 6 and 7 is substantially as occurs in the earlier described embodiment. That is, the shrinkable film or layer 13 and the ink layer 12 are heated in the area of the indicia 24, the shrinkable layer 13 is caused to withdraw from this area carrying with it the ink layer 12 to thus form the gap 30 in both of these layers, allowing the color of the base sheet 11 to show through and create the resulting color contrast and the coded indicia in the sheet material 10. To reemphasize the point, since there is only a small amount of pressure applied against the sheet material in this example and no backing member is utilized, the base sheet 11 has little or no projection into the gap 30, as indicated in the cross section of FIG. 7.

Up to this point in the description of the invention, each of the examples of sheet material 10 has included a shrinkable layer 13 which acts in the novel manner to carry an ink layer 12 outwardly away from the heated area in the form of the indicia 24 to thereby expose a portion of the base sheet 11 and form a coded indicia in the sheet material by resulting color contrast. However, in accordance with the broadest aspects of the present invention and as schematically illustrated in FIG. 8, the method of the invention, as now contemplated, can be practiced in some instances on a laminate of sheet material which does not include such a shrinkable layer 13. For example, in a packaging material wherein cellophane is used as the base 11, it is unnecessary to employ a plastic layer, as shown in FIG. 8, so that the only other necessary layer comprises the ink layer 12. In this instance, the sheet material is preferably positioned so that the ink layer 12 faces the backup member 35 and, when the raised indicia 24 of the die 20 is brought into operative engagement to thereby apply heat and pressure, the ink layer 12 softens and thence is squeezed away from the area by virtue of the cooperation between said indicia 24 and said backup member 35 (same action as illustrated in FIGS. 3 and 4) thereby forming the gap 30 in said ink layer 12, as shown in FIG. 8. This then, as before, allows the base sheet 11 to show through the ink layer 12 and by the resulting color contrast forms the coded indicia in the sheet material 10.

Alternatively, it is possible to provide an additional overlayer of material as indicated by the reference numeral 45 and the dash-dot outline of FIG. 8. In this case, the overlayer 45 would necessarily be transparent to allow viewing of the gap 30 in the ink layer 12 from the outside of the package. In this last embodiment, it will be realized that both the base sheet 11 and the overlayer 45 remain intact to give full protection to the contents of the bag. Similarly, by carefully controlling the heat and pressure in the other embodiments described, it is believed to be possible to perform the method of the invention by shrinking away only the one or two of the than the full cross section of the composite plastic layer 13 to retain full protection; however, it has been found plastic sub-layers 17, 18 adjacent the ink layer 12 or less that the surface area of the illustrated gap 30 is, in practice, so small as compared to the full surface area of the bag that the loss of protection is insignificant.

In brief summary, it can be seen that there has been provided a particularly efficient and simple method for code dating packaging material without the use of elaborate mechanical structure and without the need for any special inks; the only requirement being that the ink layer 12 be of sufficiently low temperature to be softened by the heat of the die 20 so as to flow away from this area and provide a gap 30 in said ink layer. Furthermore, the coded indicia thus formed on the sheet material 10 has been found to be highly legible and does not in any manner affect the strength or integrity of the finished package.

In this disclosure, there is shown and described only the preferred embodiment of the invention, but, as aforementioned, it is to be understood that the invention is capable of various changes or modifications within the scope of the inventive concept as expressed by the accompanying claims.

We claim:

1. The method of code dating comprising the steps of providing a laminated material having a base sheet, a heat shrinkable plastic layer and a thermoplastic ink layer of different color than said base sheet attached to said plastic layer, applying heat in the form of indicia to said material, and maintaining said heat only sufficient to cause said plastic layer to withdraw from the area corresponding to said indicia by shrinkage and to cause said ink layer to soften, said ink layer being carried by the withdrawing plastic layer so as to flow outwardly away from said area to provide a gap in both of said plastic and ink layers corresponding to said indicia whereby to permit said base sheet to remain substantially unchanged and to show through both said plastic and ink layers to form a coded indicia by the resulting color contrast.

2. The method of claim 1 wherein said ink layer is positioned between said plastic layer and said base sheet, said ink layer being attached to said plastic layer with greater affinity than to said base sheet so as to encourage the separation of said plastic layer from said base sheet to enhance the withdrawing action during the application of said heat.

3. The method of claim 1 wherein said heat shrinkable plastic layer is biaxially orientated so that the withdrawing action forms said coded indicia of true shape.

4. The method of claim 1 wherein is further included the steps of providing pressure in the form of said indicia for a selected time period, providing a rigid backing member for said material during the application of said heat and pressure, said heat and pressure being applied to the back side of said base sheet, said pressure being sufficient to squeeze said ink layer away from said area to aid in forming said gap and to form a permanent indentation of said base sheet into said gap to enhance the distinctiveness of said coded indicia.

5. The method of claim 4 wherein said rigid backing member is provided with a smooth, nonstick operative surface whereby said layers in said area are repelled and remain on said material during the coding operation.

6. The method of claim 1 wherein said material is maintained under tension during the application of said heat.

7. The method of claim 1 wherein is further included the steps of providing pressure in the form of said indicia for a selected time period, and the application of said heat and pressure is provided by the step of engaging said material with a rigid, heated die member having raised indicia formed on the operative face thereof.

8. The method of code dating comprising the steps of providing a laminated material having at least a base sheet and a thermoplastic ink layer of different color than said base sheet attached thereto, providing a rigid backing member for said packaging material, applying heat and pressure in the form of indicia to said material against said rigid backing member, and maintaining said heat and pressure for a time period only sufficient to cause said ink layer to soften and to be squeezed away from the area of said indicia to provide a gap in said ink layer corresponding to said indicia whereby to permit said base layer to remain substantially unchanged and to show through said ink layer to effect the coding operation by the resulting color contrast.

9. The method of claim 8 wherein said heat and pressure is applied against the back side of said base sheet, said pressure being sufficient to form a permanent indentation of said base sheet into said gap to enhance the distinctiveness of said indicia.

10. The method of claim 9 wherein said material is further provided with an overlayer on the opposite side of said ink layer from said base sheet, said heat being insufficient to form a gap in said overlayer whereby the same serves as a backing for said squeezing action, said overlayer being transparent to allow said base sheet to show through said gap formed in said ink layer.

11. The method of code dating comprising the steps of providing a laminated material having a base sheet, a heat shrinkable plastic layer and a thermoplastic ink layer of different color than said base sheet attached to said plastic layer, providing a rigid backing member for said material, applying heat and pressure in the form of indicia to said material against said rigid backing member, and maintaining said heat and pressure for a time period only sufficient to cause said plastic layer to withdraw from the area corresponding to said indicia by shrinkage and to cause said ink layer to soften, said ink layer being carried by the withdrawing plastic layer so as to flow outwardly away from said area, said pressure being sufficient to physically squeeze said ink layer to cause the same to flow outwardly away from said area to improve the withdrawal action caused by said shrinkage of said plastic layer, whereby to provide a gap in both of said plastic and ink layers corresponding to said indicia whereby to permit said base layer to remain substantially unchanged and to show through both said plastic and ink layers to form a coded indicia by the resulting color contrast.

12. The method of claim 11 wherein the application of said heat and pressure is provided by the step of engaging said material with a rigid, heated die member having raised indicia formed on the operative face thereof, and wherein said rigid backing member is provided with a smooth, nonstick operative surface whereby said layers in said area are repelled and remain on said material during the coding operation.

13. The method of claim 11 wherein said ink layer is positioned between said plastic layer and said base sheet, said ink layer being attached to said plastic layer with greater affinity than to said base sheet so as to encourage the separation of said plastic layer from said base sheet to enhance the withdrawing action during the application of said heat and pressure.

References Cited

UNITED STATES PATENTS

| | | | |
|---|---|---|---|
| 2,307,909 | 1/1943 | Avery | 156—209 |
| 3,151,542 | 10/1964 | Steiner | 101—32 |

OTHER REFERENCES

Lohse: German application 1,152,936, printed Aug. 14, 1963 (KL81 A1), 2 pages spec., 1 sheet drawing.

LELAND A. SEBASTIAN, Primary Examiner

U.S. Cl. X.R.

53—14, 131; 101—32; 156—209, 277; 264—132